US007814784B1

(12) United States Patent
Swindell

(10) Patent No.: US 7,814,784 B1
(45) Date of Patent: Oct. 19, 2010

(54) DIAL A SAIL

(76) Inventor: Bob Francis Swindell, 2880 SW. Versailles Ter., Okeechobee Waterway, Stuart, FL (US) 34997-1371

( * ) Notice: Subject to any disclaimer, the term of this patent is extended or adjusted under 35 U.S.C. 154(b) by 454 days.

(21) Appl. No.: 11/705,182

(22) Filed: Feb. 12, 2007

(51) Int. Cl.
G01C 21/00 (2006.01)
(52) U.S. Cl. .................................. 73/178 R
(58) Field of Classification Search ............... 73/178 R
See application file for complete search history.

(56) References Cited

U.S. PATENT DOCUMENTS

| 2,527,691 | A | * | 10/1950 | Watson ..................... 33/1 AA |
| 4,122,710 | A | * | 10/1978 | Meller ..................... 73/178 R |
| 4,149,410 | A | * | 4/1979 | Lonnroth ................... 73/178 R |
| 4,236,409 | A | * | 12/1980 | Brachet ..................... 73/178 R |
| 4,340,936 | A | * | 7/1982 | Mounce ..................... 701/200 |
| 4,446,729 | A | * | 5/1984 | Watson, III ............... 73/178 R |
| 4,481,810 | A | * | 11/1984 | O'Brien ................... 73/178 R |
| 5,127,358 | A | * | 7/1992 | Galloway et al. ........... 116/265 |
| 5,450,344 | A | * | 9/1995 | Woo et al. ................... 701/213 |

* cited by examiner

Primary Examiner—Lisa M Caputo
Assistant Examiner—Jermaine Jenkins

(57) ABSTRACT

A device for guiding the helmsman and crew of a sailing vessel in steering a correct point of sail course relative to the true wind by knowing the numerical compass degrees for every point of the compass rose for every point of sail. The device employs two dials coupled together to present the direction of the true wind in compass points to the point of sail on both a starboard tack and port tack in numerical compass degrees. This manual operated computer calculates the compass reading for all points of sail.

6 Claims, 3 Drawing Sheets

Drawing of Dial one and Dial Two Joined.

Drawing of Dial One of two dials

FIGURE 2"

Drawing of Dial Two
of two dials.

Drawing of Dial one and Dial Two Joined.

DIAL A SAIL

BACKGROUND OF THE INVENTION

1. Field of the Invention

The invention relates to an indicator for indicating the course-to-steer relative to the angular position of the Point of Sail of the sailing vessel.

2. Description of the Prior Art

A prior art for determining point of sail relative to the true wind has limitation in that they require electrical power to operate. They do not indicate the numerical compass degrees required for the many points of sail required to reach a destination. Compass devices provide the direction relative to North for aiding in steering the boat; they lack the ability to calculate the various compass degrees for each point of sail.

In prior art devices wind vanes have been used to display to the helmsman the wind direction relative to the center line of the sailing vessel. The helmsman must go through the mental process of comparing the ships compass to the desired course for the correct point of sail since other than the optimum point of sail relative to wind and course results in lower speed.

A further disadvantage of these devices is that they are subject to failure due to the environment/electrical power and may cause erroneous response by the helmsman. Thus with the invention there is provided a device for quickly providing to a helmsman of a sailing vessel the indication of the heading the vessel should be on with respect to each point of sail on both starboard and port tracks.

SUMMARY OF THE INVENTION

Therefore the object of the invention is to provide an indicator device for quickly and accurately providing information on each compass heading relative to the true wind. To numerically show each point of sail compass degrees along with the jibbing area for safety to the crew and vessel. To provide an indicator device that is not dependent on any source of electric power to operate. The further object of the invention is to provide the numerical compass degrees by converting the 16 points of the compass into a numerical value as show on the ships compass. These and other objects are fulfilled by means of the two dial wheels affixed together. They are designed to be rotated in various positions relative to a true wind direction that results in the calculation of the position of each point of sail on a starboard or port tack to be quickly shown in numerical degrees. In yet another embodiment of the invention the indicator device is used in combination with the vessels ships compass to determine the point of sail the vessel is on. The current ships heading as shown by the ships compass is then found on Dial One and Dial Two quickly shows the relationship to the true wind and point of sail.

DESCRIPTION OF THE PREFERRED EMBODIMENT

Figure 1:
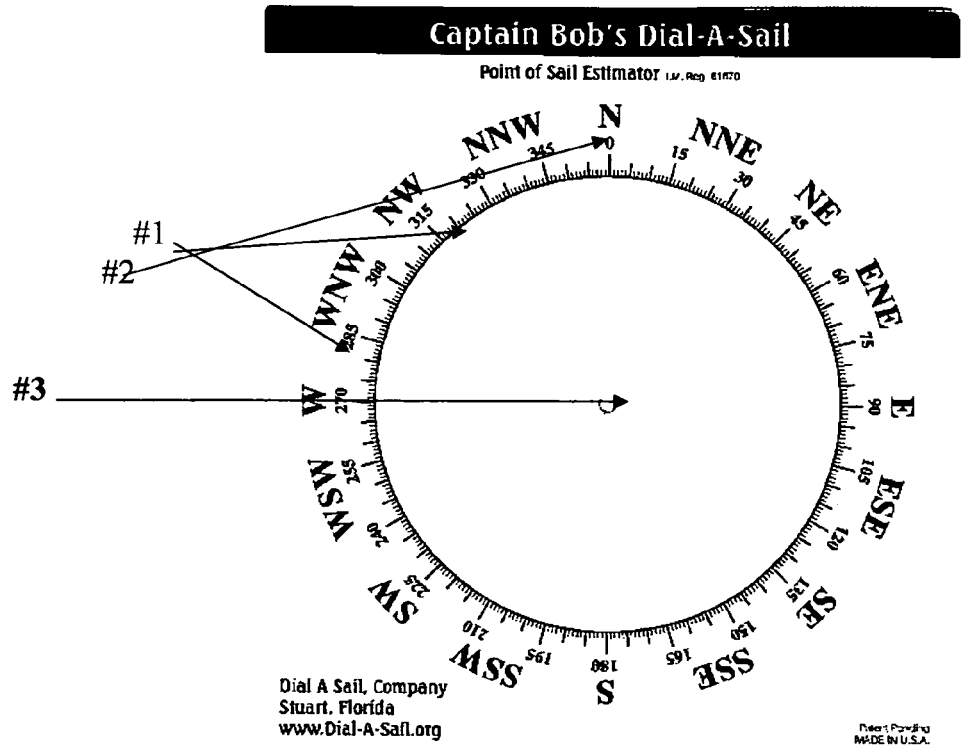
FIG. 1. is showing the mathematical principles on which the invention is based.

Turing now to the drawings, in which the reference numerals represent like parts.

FIG. 1 is a diagram illustrating the angle of incidence. Reference numeral 1 designates the 16 points of the compass and a numerical value in the 360 degrees of the compass rose. Reference numeral 2 designates the corresponding compass points with the actual compass degrees for each degree. Reference numeral 3 designates the location of the connecting rivet for the two dials to be joined together.

Figure 2:
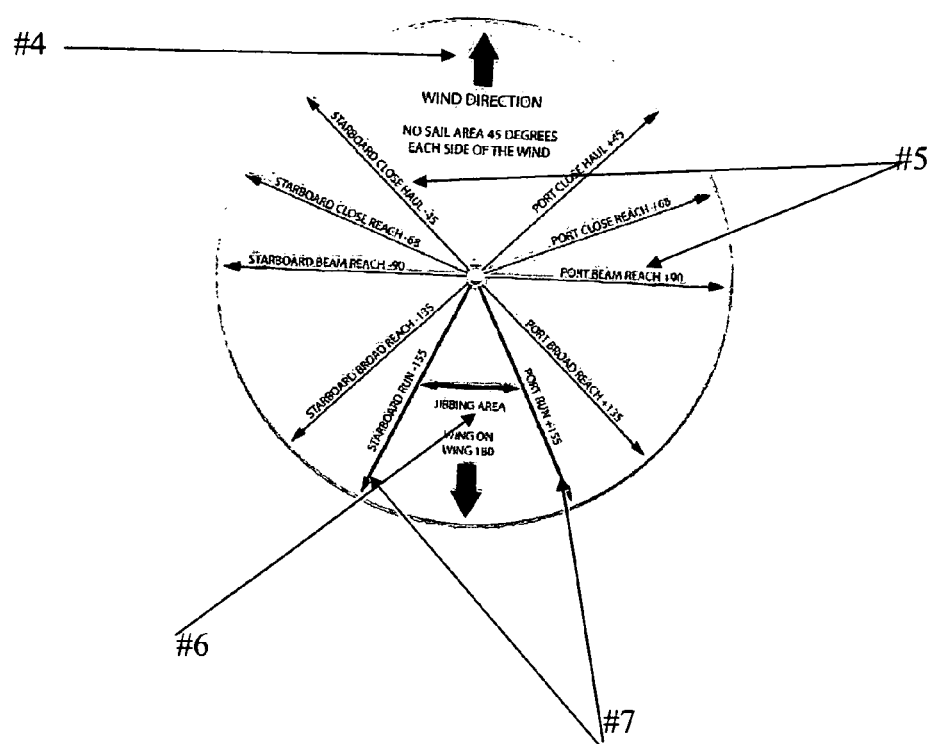
FIG. 2. Illustrates the follow-the pointer mode of operation

FIG. 2 is the diagram illustrating the rotating dial to be aligned with FIG. 1 while reference numeral 4 designates the true wind direction arrow in black for placement at the correct compass degrees for the direction of the true wind. Reference numeral 5 shows the arrow that aligns with the point of sail for each change in wind direction. It shows the proper track to be starboard or port. Reference numeral 6 shows the total number of degrees for the jibbing area, printed in red. Reference numeral 7 shows the compass degrees for a starboard or port tack jibbing area when sailing on that tack.

Figure 3:
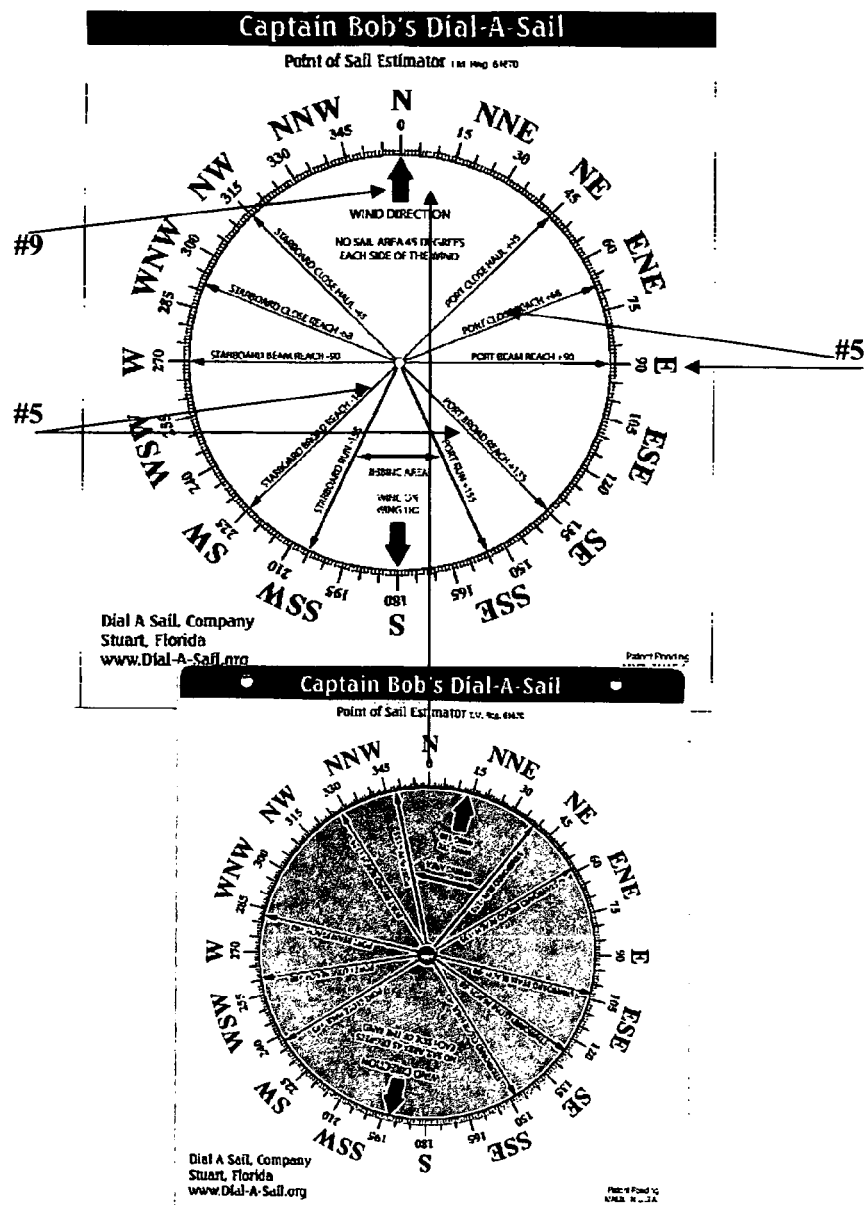
FIG. 3 Shows the mode of operation when the pointer is used to provide the compass readings relative to the true wind.

FIG. 3 diagrammatically illustrates the results of the two dials working in unison Reference numeral 9 shows the wind direction aligned to 000 degrees while the 5 line automatically shows the degrees for each point of sail. The comparison means 4 determines the difference between the angle of 5 and the compass degrees show by 1 and 2.

The specification and drawings are, accordingly, to be regarded in an illustrative rather that a restrictive sense. It will, however, be evident that additions, subtractions, deletions and other modifications and change may be made thereunto without departing from the broader spirit and scope of the invention as set forth in the claims. Although specific embodiments of the invention have been described, various modifications, alterations, alternative constructions, and equivalents are also encompassed within the scope of the invention.

What I claim as my invention is:

1. A two part manually adjustable dial calculator for a sailing vessel comprising: two dials wherein a first dial of said two dials rotates about a central axis being arranged on top of a second dial of said two dials wherein said second dial being stationary; wherein said first dial indicates a true wind direction whereby a change of said wind direction corresponds with an alignment of a point of sail indicia; wherein said second dial indicates a correct compass heading in numerical values of 360 degrees of a compass rose for each said point of sail indicia.

2. The two part manually adjustable dial calculator according to claim 1, wherein said point of dial indicia includes a set of tracks being a starboard and a port tack.

3. The two part manually adjustable dial calculator according to claim 1, wherein a black arrow, for placement at said correct compass heading of said second dial, being located on said first dial indicates said true wind direction.

4. The two part manually adjustable dial calculator according to claim 1, wherein a red area located on said first dial indicates a total number of degrees for a jibbing area for preventing an accidental jib and providing information for adjustment of a sail of said vessel.

5. The two part manually adjustable dial calculator according to claim 2, further includes said starboard indicating astarboard close haul at −45 degrees, a starboard close reach at −68 degrees, a starboard beam reach at −90 degrees, a starboard broad reach at −135 degrees and a starboard run at −155 degrees.

6. The two part manually adjustable dial calculator according to claim 2, further includes said port tack indicating a port close haul +45 degrees, a port close reach +68 degrees, a port beam reach at +90 degrees, a port broad reach at +135 degrees and a port run at +155 degrees.

* * * * *